United States Patent [19]

Agnew et al.

[11] 4,009,781
[45] Mar. 1, 1977

[54] SLIDE TRAY AND TAPE CASSETTE CONTAINER

[75] Inventors: Paul G. Agnew, Braintree; Stephen P. Becker, Framingham, both of Mass.

[73] Assignee: Learncom, Inc., Boston, Mass.

[22] Filed: Jan. 12, 1976

[21] Appl. No.: 648,478

[52] U.S. Cl. .............................. 206/387; 206/216; 206/523; 220/20
[51] Int. Cl.² ...................................... B65D 85/672
[58] Field of Search ............ 206/73, 74, 216, 387, 206/523; 220/20

[56] References Cited

UNITED STATES PATENTS

| | | |
|---|---|---|
| 3,384,221 | 5/1968 | Houtman .......................... 206/523 |
| 3,756,383 | 9/1973 | Kryter ................................ 206/73 |
| 3,858,720 | 1/1975 | Flagher ............................. 206/216 |

*Primary Examiner*—George T. Hall
*Attorney, Agent, or Firm*—William Nitkin

[57] ABSTRACT

A container for shipping, storing and organizing a slide tray and associated tape cassette formed from rigid material comprised of a first compartment for receipt of a slide tray and second compartment for receipt of a tape cassette. Cushioning means can be provided within the first compartment and on the inside of the top casing.

11 Claims, 3 Drawing Figures

SLIDE TRAY AND TAPE CASSETTE CONTAINER

BACKGROUND OF THE INVENTION

1. Field of the Invention

The invention disclosed herein is a container for the shipping, storing, and organizing of a slide tray or trays including a slide tray of the rotary type and one or more tape cassettes, its structure designed to prevent damage to both slide tray or trays and tape cassette or cassettes during shipment and handling, and to organize and keep together associated slide trays and tape cassettes.

2. Description of the Prior Art

Initially the shipping and storing of a slide tray or trays, including a rotary slide tray, and one or more associated tape cassettes was accomplished by placing them together in a box where the tape cassettes were able to move loosely about during shipment and this movement usually caused damage to the tape cassettes. To prevent such damage, other methods of packaging incorporating cushioning were developed. The most significant development was a notebook-like structure whose top member opened by a hinge flap and had compartments on the inside of its top member for holding tape cassettes. A rotary slide tray or other type of slide tray could be placed within its bottom member. This notebook-like structure, while preventing the tape cassettes from striking the slide tray, did not have the necessary strength and durability to withstand rough handling during shipment as the tape cassettes could be compressed against the top of the slide tray.

SUMMARY

The present popularity of photographic slides with taped voice accompaniment both for entertainment and instructional purposes where the taped vocal program provides narration for each slide, has created the need for a safe shipping and storage unit to accommodate either a rotary, rectangular or cube type slide tray and its associated tape cassettes. In some instances, the tape cassette can control the timing of each slide's projection. The container of this invention provides separate compartments for the secure positioning of a slide tray or trays and its associated tape cassettes during shipment or storage.

In one embodiment, the container of this invention is comprised of a rectangular bottom casing having a first compartment for receipt of one or more slide trays and a second compartment for receipt of one or more tape cassettes, the second compartment having one or more apertures on its top surface for insertion of one or more tape cassettes. Since both slide trays and tape cassettes are available in a variety of sizes, the size of the container and the relative sizes of the first and second compartments can vary. Cushioning, such as foam, air-bubbled plastic or equivalent, can be affixed to the inside bottom of the first compartment and to the inside of the top casing. The top casing can have finger inserts to assist in opening the container. Identification means can be located on one or more of the outer sides of the top casing.

The container of this invention, its construction and operation will become clearer with reference to the following drawings and Description of the Preferred Embodiment.

DESCRIPTION OF THE PREFERRED EMBODIMENT

Figure 1:
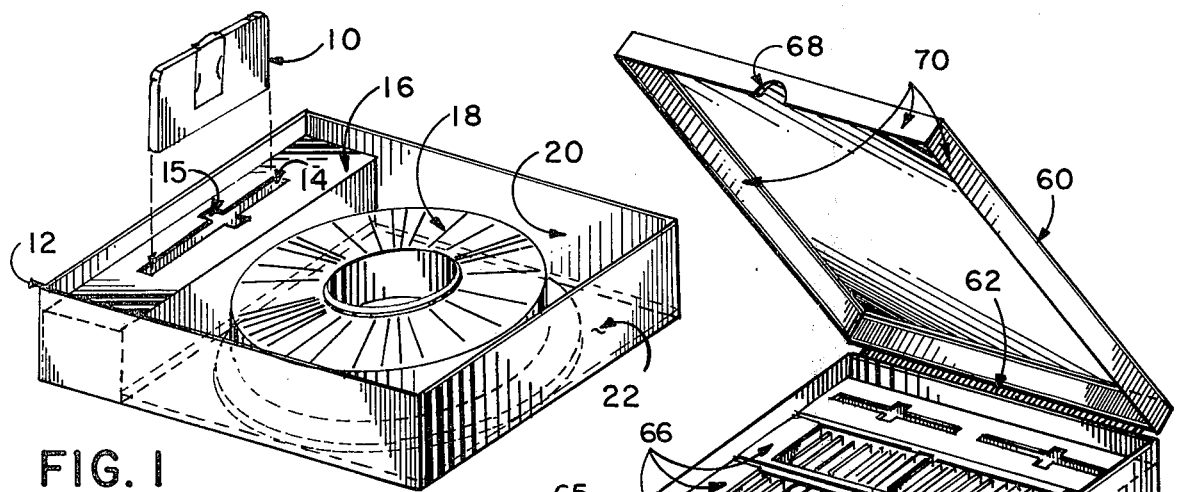
FIG. 1 is a perspective view showing the bottom casing of this invention with rotary slide tray in position and tape cassette located above its compartment.

FIG. 1 illustrates bottom casing 12 of the container of this invention with rotary slide tray 18 in place within first compartment 20. Tape cassette 10 is shown above aperture 14 of tape cassette storage member 16 located along the inner side of bottom casing 12. Aperture 14 can be large enough to accommodate a tape cassette within its own container. It should be noted that tape cassette storage member 16 is composed of material of sufficient strength such as styrofoam, paperboard or equivalent material to prevent rotary slide tray 18 from crushing the tape cassette during shipment. At the bottom of first compartment 20 is resilient cushioning material 22 indicated in outline fashion which can be of foam or equivalent resilient material to cushion the rotary slide tray from damage during impact. The top surface of the tape cassette storage member 16 should be somewhat lower in height than the top of the tape cassette so that the tape cassette can be easily removed from aperture 14. To assist in the removal of a tape cassette, finger insert 15 can be cut out on opposite sides of aperture 14.

Figure 2:
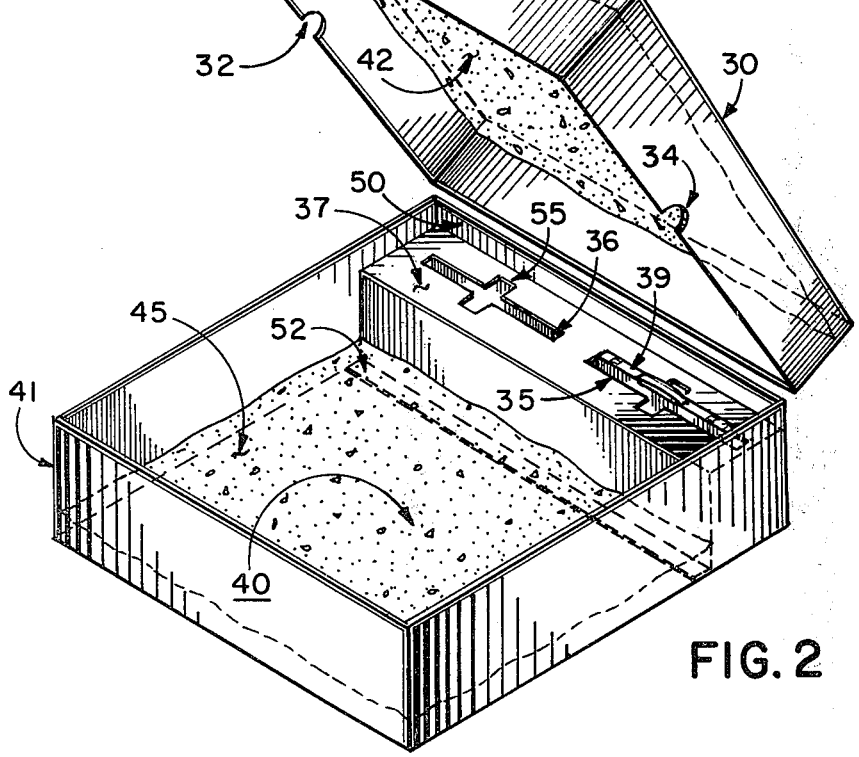
FIG. 2 illustrates a perspective view of the top and bottom casing of the container of this invention with cushioning in place and with a tape cassette inserted within a compartment.

FIG. 2 illustrates the container of this invention comprised of bottom casing 41 and top casing 30 showing first compartment 40 for receipt of a slide tray empty. Cushioning material 45 and 42 is affixed respectively to the bottom inside of first compartment 40 and to the inside of top casing 30. In this embodiment, apertures 35 and 36 are located in top surface 37 of tape cassette storage member 38. Within aperture 35 is tape cassette 39 while aperture 36 is shown without a tape cassette. Finger insert 55 is cut out from each side of aperture 35 and 36 to assist in the removal of a tape cassette. In embodiments where tape cassette storage member 16 is of a molded construction, a finger insert in the form of a groove may be incorporated on opposite sides of apertures 35 and 36 to assist in the removal of the tape cassette. Also illustrated is label 44 for identification of the contents of the container. In this embodiment, tape cassette storage member 37 can be formed from a folded paperboard or equivalent material where upper flap 50 is affixed to an inner side of bottom casing 12 and lower flap 52 is affixed to the inside bottom of first compartment 40. Finger inserts 32 and 34 are located on opposite sides of top casing 30 to assist in lifting the top casing.

Figure 3:
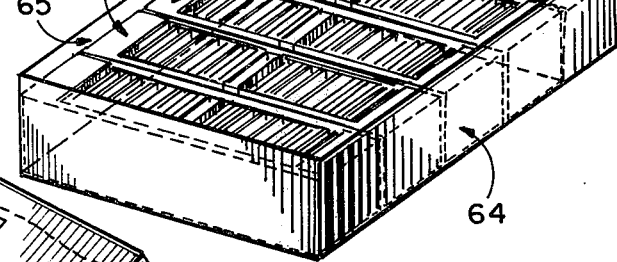
FIG. 3 illustrates a perspective view of an embodiment of the container of this invention wherein the top casing and bottom casing are hingeably attached and a plurality of rectangular slide trays are contained within the first compartment.

FIG. 3 illustrates an embodiment of this invention wherein top casing 60 is hingeably attached at point 62 to bottom casing 64. Shown within first compartment 65 is a plurality of rectangular slide trays 66. In this embodiment finger inserts 68 can be located on the front side of top casing 60 for ease in lifting up the top casing. It has been found that side members 70 of top casing 60 add stability and strength to the container of this invention.

We claim:

1. A container for the shipment, storage and organization of a slide tray and associated tape cassette comprising:
    a first casing member forming a walled enclosure having a bottom and sides;
    a first compartment within said first casing member for receipt of said slide tray;
    a rectangular cassette storage member mounted securely to abut an inner adjacent side and bottom of said first casing member, said horizontal storage member having an upper surface being recessed in relation to the height of said abutting casing side and having at least one aperture compartment therethrough for receipt of said tape cassette; and
    a second casing member to cover said first casing member and to be removable therefrom to completely expose said first compartment and said cassette storage member.

2. A container as described in claim 1 wherein said first casing member has resilient cushioning means affixed upon the bottom therein within said first compartment.

3. A container as described in claim 2 wherein said first compartment is for receipt of a plurality of slide trays.

4. A container as described in claim 2 further including a plurality of said recessed rectangular cassette storage members having at least one aperture compartment therein for receipt of a plurality of said tape cassettes.

5. A container as described in claim 2 wherein said cassette storage member has finger inserts associated with said aperture compartment for easy removal of said tape cassette from said cassette storage member.

6. A container as described in claim 2 wherein said second casing member has sides thereon and finger inserts on the side edges thereof to assist in the removal of said second casing from said first casing.

7. A container as described in claim 2 wherein said first casing member and said second casing member are rectangular and slideably engageable.

8. A container as described in claim 2 wherein said second casing member and said first casing member are hingeably attached.

9. A container as described in claim 1 wherein said tape cassette storage member is comprised of a label member of rigid material having a lower portion of which is affixed to the interior bottom of said first casing member and having an upper vertical portion abutting said upper horizontal surface portion affixed to said adjacent inner side of said first casing.

10. A container a described in claim 9 wherein said tape cassette storage member has a plurality of apertures on its top surface for the individual receipt of a plurality of tape cassettes.

11. A container as described in claim 1 wherein said second casing member has resilient cushioning means affixed upon the interior side thereof.

* * * * *

UNITED STATES PATENT AND TRADEMARK OFFICE
CERTIFICATE OF CORRECTION

PATENT NO. : 4,009,781
DATED : March 1, 1977
INVENTOR(S) : Paul G. Agnew and Stephen P. Becker It is certified that error appears in the above-identified patent and that said Letters Patent are hereby corrected as shown below:

In Claim 9, line 2, delete "label" and insert --folded--.

Signed and Sealed this

Thirty-first Day of May 1977

[SEAL]

Attest:

RUTH C. MASON
*Attesting Officer*

C. MARSHALL DANN
*Commissioner of Patents and Trademarks*